Jan. 17, 1933.　　　C. D. SCHMIDT　　　1,894,600
CHAIN
Filed June 4, 1928
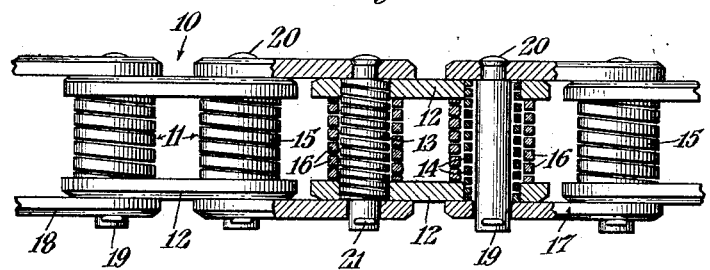
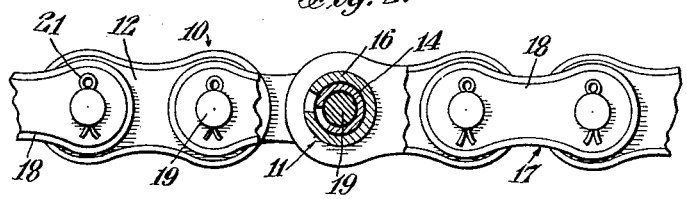
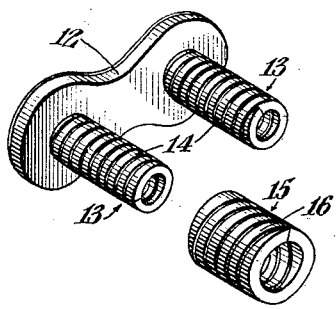
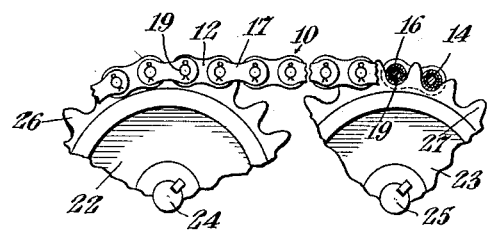
INVENTOR
Charles D. Schmidt
BY
ATTORNEYS Patented Jan. 17, 1933

1,894,600

UNITED STATES PATENT OFFICE

CHARLES D. SCHMIDT, OF JAMAICA, NEW YORK

CHAIN

Application filed June 4, 1928. Serial No. 282,839.

This invention relates to transmission chains generally, and particularly to roller chains adapted to transmit power, to convey material or the like.

The object of the invention, generally stated, is to provide a chain with means to compensate for variations of pitch in manufacture.

To the above and other ends, the invention consists in the features of construction, combinations of devices and arrangements of parts hereinafter described and particularly pointed out in the claims.

In the manufacture of chains, such as power transmission and conveyor roller chains, silent chains and block chains and the like, the permissible allowances for variations in dimensions, or the tolerances, are held within as close limits as possible, for the reason that each link must be of a given size, and multiples of the links must mesh with rotary members or sprocket wheels whose teeth are accurately spaced. The pitch of the chain, or generally the distance between the axes of the transverse pins, must correspond closely with the pitch of the sprocket wheels. It is found, however, that when the chain links are assembled into a chain, such chain is either too short or too long; and it is rarely that links thus assembled will fortuitously provide a chain that is exactly divisible by the pitch or prime factor. It has not been found to be practicable by the usual methods to manufacture a chain whose links are exactly divisible by the prime factor, that is by the pitch of the chain; and the cost of producing an absolutely accurate chain by the known methods of grinding and lapping would be so great as to be prohibitive.

While it is true that the chains now in common use are fairly efficient, there is nevertheless a considerable loss of power due to inaccuracy of pitch in the overall length of the chain; and this inaccuracy of pitch limits to a marked degree the speed at which the chain may travel. Such chains also are subject to rapid wear causing increased inaccuracy in the pitch, and to shortening of life due to the variations in pitch, as well as to inability to lubricate the chains in service.

The general object of the present invention is to overcome these objectionable features, and to provide a chain or link belt embodying a compensating medium or means for taking care of these variations so that in actual service the chain will function true to pitch enabling high speeds to be attained. A further object of the invention is to provide a chain or link belt with means for compensating for variations in the matter of alignment; and a still further object is to provide a chain with bushings and rollers that will yield when co-acting with the sprocket wheels.

In carrying out these objects of the invention, I provide a cylindrical bushing of helical form and also a cylindrical roller of helical form, the bushings and rollers being preferably made of wire or the like, either of square or round cross section or any other desirable shape, the material being tempered both for wear and resiliency, so that when assembled in the chain such bushings and rollers function in certain respects as spiral springs.

The invention will be described in detail in connection with the accompanying drawing. It is to be understood that while only one form of the invention is shown therein, adapted to a roller chain for power transmission or driving, nevertheless the invention is readily applicable to various styles and kinds of chains other than that illustrated. In the drawing, Fig. 1 is a plan view, partly in section, of a power-transmission roller chain embodying the invention, only so much of the chain being shown as is necessary to a full understanding of said invention.

Fig. 2 is a side elevation of Fig. 1, parts being shown in section.

Fig. 3 is a perspective view of certain of the parts detached; and

Fig. 4 is a fragmentary view on a reduced scale of my improved chain associated with a pair of sprocket wheels.

The chain to which the invention is shown as applied herein is designated as a whole by the numeral 10, and is, as stated, of the roller chain type, consisting of alternate roller sections and connecting sections. Each roller section 11 comprises a pair of side links 12 connected by spacers, bushings or sleeves. As heretofore constructed these bushings have been in the form of solid or continuous cylinders made usually of tubing or of plate metal properly cut and rolled to shape. My improvements, however, contemplate the replacement of the usual style of sleeve or bushing by a bushing 13 which is in the form of a helix.

Preferably said helix 13 is made of wire, being composed of coils 14 square in cross-section and so closely wound as to be substantially contiguous. The helices are suitably tempered both for wear and resiliency, so that they provide in effect spring helices or spiral springs. It is to be understood, of course, that if found desirable the helices, spring bushings or compensating members 13 may be otherwise constructed than as described. Said helices or bushings 13 are preferably secured in holes or seats in the side links 12 by a force fit, thus constituting a frame-work for supporting the rollers. It will be noted that this frame-work instead of being rigid as in prior known constructions is resilient or variably yieldable due to the employment of my novel bushings.

Preferably associated with the roller sections 11 are rollers 15 which also I prefer to make helical in form, said rollers each being constituted by coils 16 square in cross section and closely wound so that they are practically contiguous. These novel rollers serve as yielding or compensating rotary members, being revolubly supported on the bushings 13. The rollers of course are mounted on the bushings during the assembling operation. Each roller section 11, it will be understood, comprises two side links 12, two bushings 13 and two rollers 15.

Each of these roller sections or link sections 11 is connected with the preceding and following roller sections by a connecting section 17, comprising two plates or side links 18 spaced apart and arranged in parallelism, said side links 18 being connected by a pair of solid transverse pins 19.

The side links 18 are disposed outside of the links 12 of the roller sections, and said pins 19 pass through and fit in the openings of the spring bushings 13, the fit being such that relative rotary motion is afforded between said bushings and the pins 19. Said pins 19 are usually of either of two styles or types, that is the riveted type and the type which is retained in place by cotter pins, the cotter-pin type being shown herein. Each of the pins 19 is headed or upset at one end as indicated at 20, its opposite end projecting beyond the face of the associate link 18 and being formed with a transverse hole to receive a cotter pin 21 whereby accidental displacement is prevented.

It will be understood that the form of the roller chain 10 herein shown is composed of alternating roller sections 11 and connecting sections 17, and that the chain is adapted to co-act with rotary elements or sprocket wheels through the rollers or rotary elements 15. A pair of such rotary elements or sprocket wheels are fragmentarily shown in Fig. 4 wherein they are designated by the numerals 22 and 23. Said sprocket wheels may be secured respectively to shafts or members 24 and 25. The teeth 26 and 27 of the wheels 22 and 23 respectively are adapted for co-operation with the chain elements which operate to transmit motion or power from one wheel to the other.

A chain constructed in accordance with my invention and comprising spiral-spring bushings and spiral-spring rollers affords a considerably greater measure of yielding than is the case where solid metal is used, and this yield, resiliency or give in the bearing area of the chain is of much importance, particularly at high speeds, since these flexible and resilient bodies will compensate for any variation in the pitch of the chain, minimizing resistance in the path of its travel, reducing friction, and affording ability to travel at high speed without the danger, due to the inaccuracies in the pitch, of riding on top of the teeth of the sprocket wheels. Also, my improved chain will absorb shocks resulting from impact or co-action with the sprocket wheels.

It is further to be noted that in carrying out the invention, no change in construction is necessary other than substituting helical bushings and helical rollers for the prior solid members; and these novel bushings and rollers can be as economically manufactured as the solid members which they replace. A chain constructed in accordance with my invention may be substituted for known chains as a connecting means between rotary elements or sprocket wheels and without other change in the mechanism, and as a result the speed of running may be very greatly increased. Furthermore the tensile strength is not impaired, since this is dependent on the side link plates and transverse pins.

It is further to be understood that the improved chain permits of lubrication in an oil bath more readily than prior constructions, since the helical elements permit the lubricant to sweat through to all bearing parts, thereby affording free and full circulation of the lubricant in operation and prolonging the life of the chain.

Variations of construction may be made and parts may be used without other parts, without departing from the invention; and, of course, other uses of the invention than those described may be resorted to.

I claim:—

1. A chain comprising links, means connecting said links comprising helical spring bushings, helical spring rollers, transverse pins, and means of absorbing shock of impact with sprocket.

2. A chain comprising links, spring bushings rigidly secured on said links, freely revolving spring rollers on said bushings, transverse pins passing through said bushings, said bushings and said rollers being resilient.

3. In a chain or link belt a compensating bushing adapted to be secured to opposite side links of the chain to maintain them spaced apart and to yield in the operation of the chain.

4. In a chain or link belt, compensating bushings and compensating rollers adapted to cooperate therewith, parts of bushings being adapted to be secured at their end portions to pairs of opposite side links and to yield in the operation of the chain.

5. A chain or link belt comprised of two types of sections alternating with each other and interconnected, one type comprising four elements constituting a unitary frame, two of said elements being parallel links connected near their ends by two bushing elements which are resilient and adapted to yield in operation to compensate for inequalities in the chain.

6. A chain or link belt comprised of two types of sections alternating with each other and interconnected, one type comprising four elements constituting a unitary frame, two of said elements being parallel links connected near their ends by two bushing elements which are resilient and adapted to yield in operation to compensate for inequalities in the chain, and rollers mounted for free rotation on said bushing elements between the link elements.

7. A chain or link belt comprised of two types of sections alternating with each other and interconnected, one type comprising four elements constituting a unitary frame, two of said elements being parallel links connected near their ends by two bushing elements which are resilient and adapted to yield in operation to compensate for inequalities in the chain, the other type of section having four elements constituting a unitary frame, two of which elements are parallel links and the other two being transverse pins connecting the links near their ends.

8. A chain or link belt comprised of two types of sections alternating with each other and interconnected, one type comprising four elements constituting a unitary frame, two of said elements being parallel links connected near their ends by two bushing elements which are resilient and adapted to yield in operation to compensate for inequalities in the chain, the other type of section having four elements constituting a unitary frame, two of which elements are parallel links and the other two being transverse pins connecting the links near their ends, the pins passing freely through the bushing elements and the links which said pins connect being arranged outside the links connected by said bushings.

9. In a chain, the combination of connected resilient compensating sections adapted to yield in the operation of the chain, and resilient rollers mounted thereon, the resilient compensating elements being incorporated in the chain sections themselves.

10. In a chain, the combination of roller sections each comprising a pair of side links, a pair of helical springs connecting said side links, and a roller rotatably mounted on each of said springs; and connecting sections for said roller sections, each connecting section comprising pins fitting inside said helical springs.

11. In a chain, the combination of a roller section comprising a pair of side links, and a pair of helical springs secured to and connecting said side links; and spring metal helices revoluble on said springs and serving as rollers.

12. In a chain, connected chain sections comprising co-operating bushings, rollers and transverse pins, said bushings being incorporated in the chain sections themselves in the form of resilient compensating members adapted to yield in operation of the chain.

13. In a chain, connected chain sections comprising co-operating co-axial spring helices relatively rotatable, interseated transverse pins and side links, the inner helix being secured to and connecting said side links.

14. In a chain, connected chain sections comprising helical spring bushings, side links to certain of which the bushings are permanently connected at their end portions, and transverse pins, said helical spring bushings being adapted to yield in the operation of the chain.

15. In a chain, connected chain sections comprising co-operating links, bushings, rollers and transverse pins, said bushings being directly attached to certain of said links, said bushings and said rollers being constituted by metal helices that are resilient and adapted to yield in the operation of the chain.

16. In a chain, chain sections comprising links and resilient compensating parts directly connected to the links themselves, the opposite end portions of each compensating part being yieldable independently of each other.

17. A chain comprising links provided with yieldable helical spring bushings directly connected to the links themselves, and rollers on said bushings.

18. A chain comprising links, means connecting said links, yieldable helical spring bushings directly attached to the links, and rollers on said bushings.

CHARLES D. SCHMIDT.